United States Patent [19]

Gosling

[11] Patent Number: 5,367,685
[45] Date of Patent: Nov. 22, 1994

[54] METHOD AND APPARATUS FOR RESOLVING DATA REFERENCES IN GENERATED CODE

[75] Inventor: James Gosling, Woodside, Calif.
[73] Assignee: FirstPerson, Inc., Mountain View, Calif.
[21] Appl. No.: 994,655
[22] Filed: Dec. 22, 1992
[51] Int. Cl.$^5$ .............................................. G06F 9/45
[52] U.S. Cl. ............................. 395/700; 364/DIG. 1; 364/280.4
[58] Field of Search .................. 364/DIG. 1 MS File; 395/700

[56] References Cited

U.S. PATENT DOCUMENTS

| | | | |
|---|---|---|---|
| 4,667,290 | 5/1987 | Goss et al. | 395/700 |
| 4,729,096 | 3/1988 | Larson | 395/700 |
| 5,201,050 | 4/1993 | McKeeman et al. | 395/700 |
| 5,307,492 | 4/1994 | Benson | 395/700 |
| 5,313,614 | 5/1994 | Goettelmann et al. | 395/700 |

*Primary Examiner*—Thomas M. Heckler
*Attorney, Agent, or Firm*—Irell & Manella

[57] ABSTRACT

A hybrid compiler-interpreter comprising a compiler for "compiling" source program code, and an interpreter for interpreting the "compiled" code, is provided to a computer system. The compiler comprises a code generator that generates code in intermediate form with data references made on a symbolic basis. The interpreter comprises a main interpretation routine, and two data reference handling routines, a dynamic field reference routine for handling symbolic references, and a static field reference routine for handling numeric references. The dynamic field reference routine, when invoked, resolves a symbolic reference and rewrites the symbolic reference into a numeric reference. After rewriting, the dynamic field reference routine returns to the main interpretation routine without advancing program execution to the next instruction, thereby allowing the rewritten instruction with numeric reference to be reexecuted. The static field reference routine, when invoked, obtain data for the program from a data object based on the numeric reference. After obtaining data, the static field reference routine advances program execution to the next instruction before returning to the interpretation routine. The main interpretation routine selectively invokes the two data reference handling routines depending on whether the data reference in an instruction is a symbolic or a numeric reference.

10 Claims, 5 Drawing Sheets

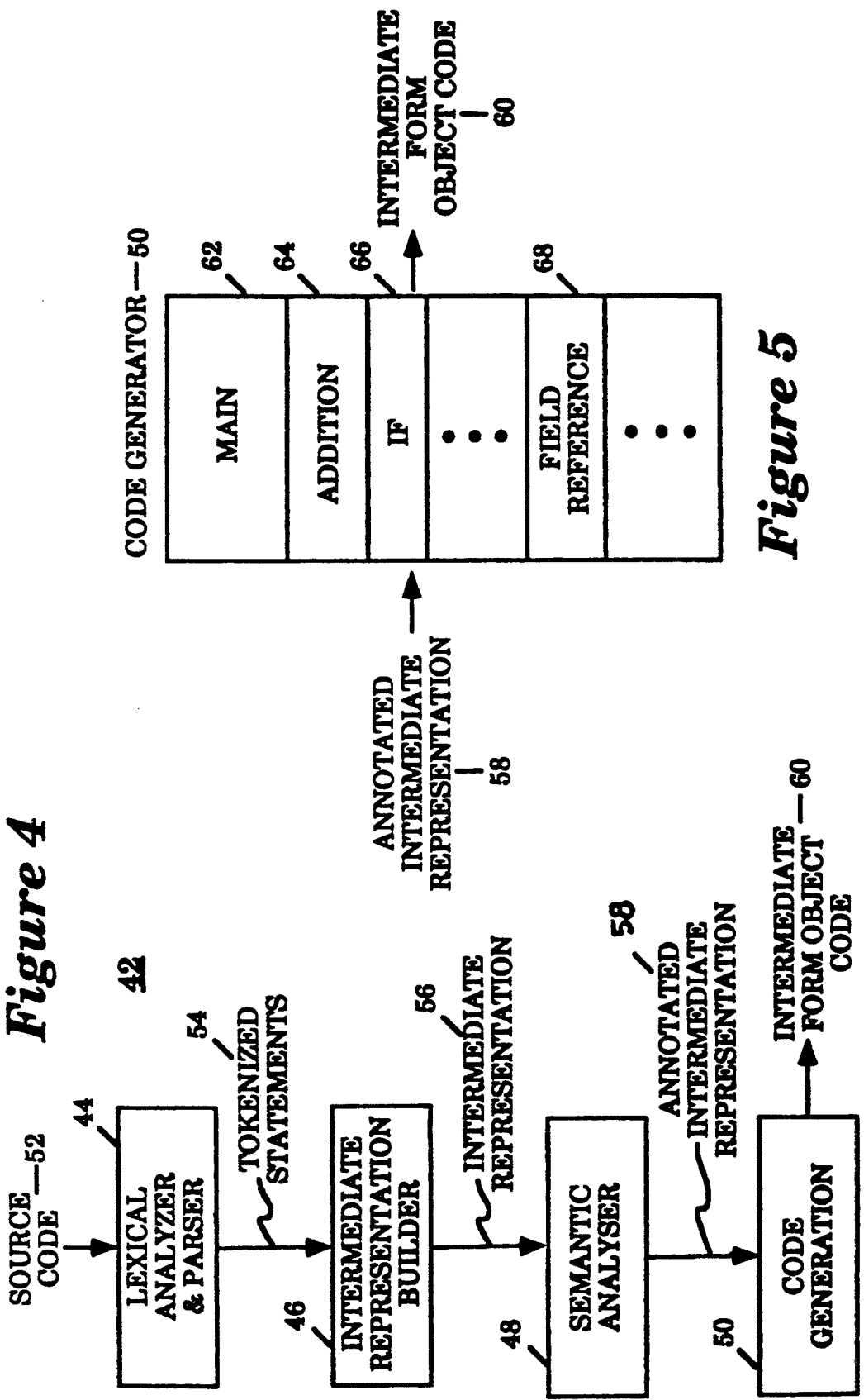

METHOD AND APPARATUS FOR RESOLVING DATA REFERENCES IN GENERATED CODE

BACKGROUND OF THE INVENTION

1. Field of the Invention

The present invention relates to the field of computer systems, in particular, programming language compilers and interpreters of these computer systems. More specifically, the present invention relates to resolving references in compiler generated object code.

2. Background

The implementation of modern programming languages, including object oriented programming languages, are generally grouped into two categories: compiled and interpreted.

In a compiled programming language, a computer program (called a compiler) compiles the source program and generates executable code for a specific computer architecture. References to data in the generated code are resolved prior to execution based on the layout of the data objects that the program deals with, thereby, allowing the executable code to reference data by their locations. For example, consider a program that deals with a point data object containing two variables x and y, representing the x and y coordinates of a point, and further assume that the variables x and y are assigned slots 1 and 2 respectively, in each instance of the point data object. Thus, an instruction that accesses or fetches y, such as the Load instruction 14 illustrated in FIG. 1, is resolved to reference the variable y by the assigned slot 2 before the instruction sequence is executed. Particular examples of programming language compilers that generate code and resolve data references in the manner described above include C and C++ compilers.

This "compiled" approach presents problems when a program is constructed in pieces, which happens frequently under object oriented programming. For example, a program may be constructed from a library and a main program. If a change is made to the library, such that the layout of one of the data objects it implements is changed, then clients of that library, like the main program, need to be recompiled. Continuing the preceding example, if the point data object had a new field added at the beginning called name, which contains the name of the point, then the variables x and y could be reassigned to slots 2 and 3. Existing programs compiled assuming that the variables x and y and are in slots 1 and 2 will have to be recompiled for them to execute correctly.

In an interpreted language, a computer program (called a translator) translates the source statements of a program into some intermediate form, typically independent of any computer instruction set. References to data in the intermediate form are not fully resolved before execution based on the layout of the data objects that the program deals with. Instead, references to data are made on a symbolic basis. Thus, an instruction that accesses or fetches y, such as the Load instruction 14' illustrated in FIG. 1, references the variable y by the symbolic name "y". The program in intermediate form is executed by another program (called an interpreter) which scans through the code in intermediate form, and performs the indicated actions. Each of the symbolic references is resolved during execution each time the instruction comprising the symbolic reference is interpreted. A particular example of a programming language interpreter that translates source code into intermediate form code and references data in the manner described above is the BASIC interpreter.

The "interpreted" approach avoids the problems encountered with the "compiled" approach, when a program is constructed in pieces. However, because of the extra level of interpretation at execution time, each time an instruction comprising a symbolic reference is interpreted, execution is slowed significantly.

Thus, it is desirable if programming languages can be implemented in a manner that provides the execution performance of the "compiled" approach, and at the same time, the flexibility of the "interpreted" approach for altering data objects, without requiring the compiled programs to be recompiled. As will be disclosed, the present invention provides a method and apparatus for resolving data references in compiler generated object code that achieves the desired results.

SUMMARY OF THE INVENTION

A method and apparatus for generating executable code and resolving data references in the generated code is disclosed. The method and apparatus provides execution performance substantially similar to the traditional compiled approach, as well as the flexibility of altering data objects like the traditional interpreted approach. The method and apparatus has particular application to implementing object oriented programming languages in computer systems.

Under the present invention, a hybrid compiler-interpreter comprising a compiler for "compiling" source program code, and an interpreter for interpreting the "compiled" code, is provided to a computer system. The compiler comprises a code generator that generates code in intermediate form with data references made on a symbolic basis. The interpreter comprises a main interpretation routine, and two data reference handling routines, a static field reference routine for handling numeric references and a dynamic field reference routine for handling symbolic references. The dynamic field reference routine, when invoked, resolves a symbolic reference and rewrites the symbolic reference into a numeric reference. After rewriting, the dynamic field reference routine returns to the interpreter without advancing program execution to the next instruction, thereby allowing the rewritten instruction with numeric reference to be reexecuted. The static field reference routine, when invoked, obtain data for the program from a data object based on the numeric reference. After obtaining data, the static field reference routine advances program execution to the next instruction before returning to the interpreter. The main interpretation routine selectively invokes the two data reference handling routines depending on whether the data reference in an instruction is a symbolic or a numeric reference.

As a result, the "compiled" intermediate form object code of a program achieves execution performance substantially similar to that of the traditional compiled object code, and yet it has the flexibility of not having to be recompiled when the data objects it deals with are altered like that of the traditional translated code, since data reference resolution is performed at the first execution of a generated instruction comprising a data reference.

BRIEF DESCRIPTION OF THE DRAWINGS

The objects, features, and advantages of the present invention will be apparent from the following detailed description of the presently preferred and alternate embodiments of the invention with references to the drawings in which:

FIG. 4 illustrates one embodiment of the compiler of the hybrid compiler-interpreter of the present invention.

FIG. 5 illustrates one embodiment of the code generator of the compiler of FIG. 4.

DETAILED DESCRIPTION PRESENTLY PREFERRED AND ALTERNATE EMBODIMENTS

A method and apparatus for generating executable code and resolving data references in the generated code is disclosed. The method and apparatus provides execution performance substantially similar to the traditional compiled approach, as well as the flexibility of altering data objects like the traditional interpreted approach. The method and apparatus has particular application to implementing object oriented programming languages. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1A:
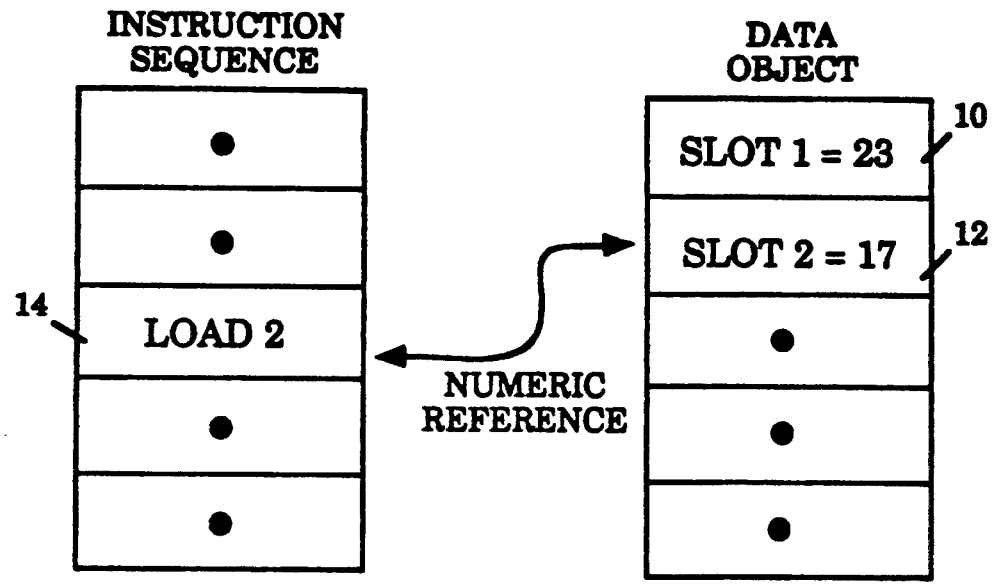
FIG. 1 shows the prior art compiled approach and the prior art interpreted approach to resolving data reference.
Figure 1B:
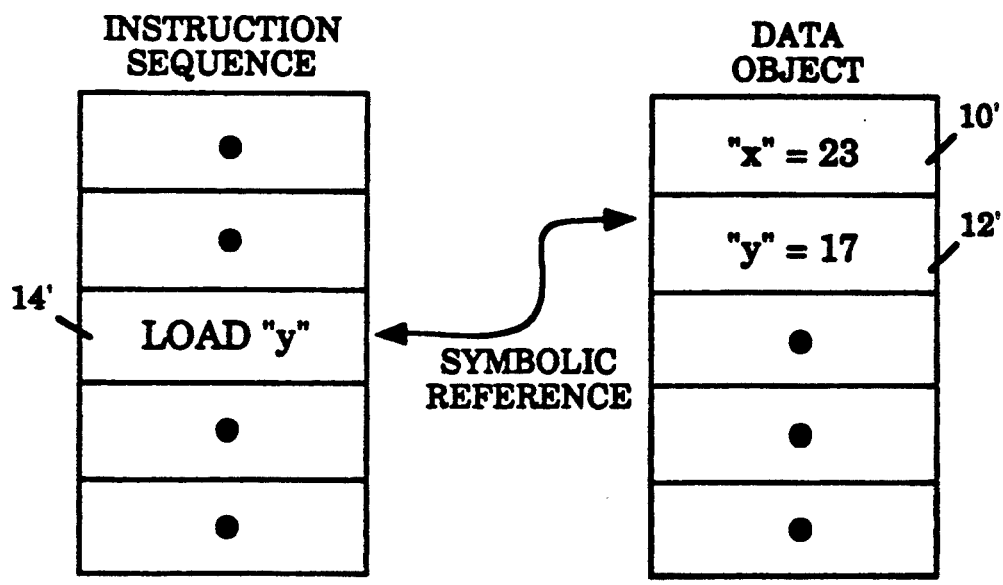
Figure 2:
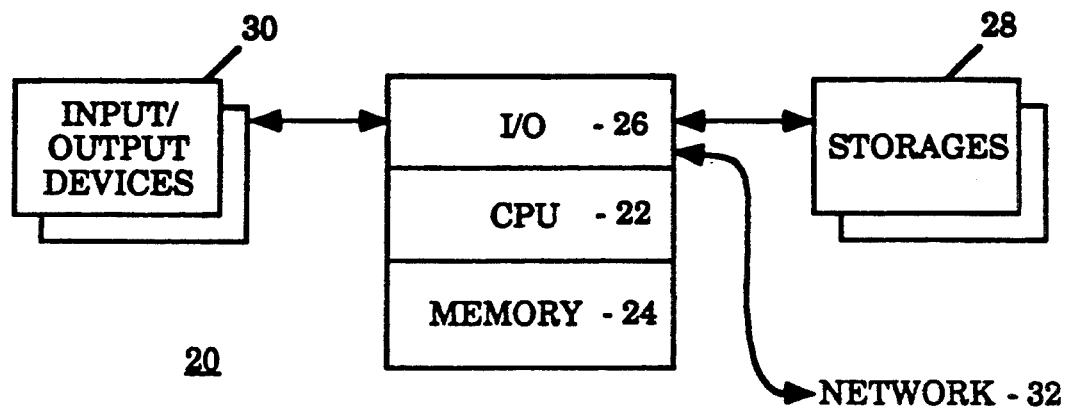
FIG. 2 illustrates an exemplary computer system incorporated with the teachings of the present invention.
Figure 3:
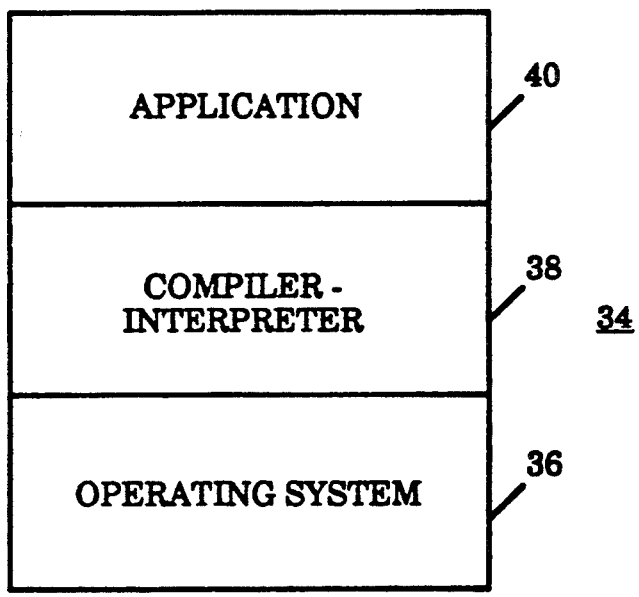
FIG. 3 illustrates the software elements of the exemplary computer system of FIG. 2.

Referring now to FIGS. 2 and 3, two block diagrams illustrating an exemplary computer system incorporated with the teachings of the present invention are shown. As shown in FIG. 2, the exemplary computer system 20 comprises a central processing unit (CPU) 22, a memory 24, and an I/O module 26. Additionally, the exemplary computer system 20 also comprises a number of input/output devices 30 and a number of storage devices 28. The CPU 22 is coupled to the memory 24 and the I/O module 26. The input/output devices 30, and the storage devices 28 are also coupled to the I/O module 26. The I/O module 26 in turn is coupled to a network 32.

Except for the manner they are used to practice the present invention, the CPU 22, the memory 24, the I/O module 26, the input/output devices 30, and the storage devices 28, are intended to represent a broad category of these hardware elements found in most computer systems. The constitutions and basic functions of these elements are well known and will not be further described here.

As shown in FIG. 3, the software elements of the exemplary computer system of FIG. 2 comprises an operating system 36, a hybrid compiler-interpreter 38 incorporated with the teachings of the present invention, and applications compiled and interpreted using the hybrid compiler-interpreter 38. The operating system 36 and the applications 40 are intended to represent a broad categories of these software elements found in many computer systems. The constitutions and basic functions of these elements are also well known and will not be described further. The hybrid compiler-interpreter 38 will be described in further detail below with references to the remaining figures.

Referring now to FIGS. 4 and 5, two block diagrams illustrating the compiler of the hybrid compiler-interpreter of the present invention are shown. Shown in FIG. 4 is one embodiment of the compiler 42 comprising a lexical analyzer and parser 44, an intermediate representation builder 46, a semantic analyzer 48, and a code generator 50. These elements are sequentially coupled to each other. Together, they transform program source code 52 into tokenized statements 54, intermediate representations 56, annotated intermediate representations 58, and ultimately intermediate form code 60 with data references made on a symbolic basis. The lexical analyzer and parser 44, the intermediate representation builder 46, and the semantic analyzer 48, are intended to represent a broad category of these elements found in most compilers. The constitutions and basic functions of these elements are well known and will not be otherwise described further here. Similarly, a variety of well known tokens, intermediate representations, annotations, and intermediate forms may also be used to practice the present invention.

As shown in FIG. 5, the code generator 50 comprises a main code generation routine 62, a number of complimentary operator specific code generation routines for handling the various operators, such as the ADD and the IF code generation routines, 64 and 66, and a data reference handling routine 68. Except for the fact that generated coded 60 are in intermediate form and the data references in the generated code are made on a symbolic basis, the main code generation routine 62, the operator specific code generation routines, e.g. 64 and 66, and the data reference handling routine 68, are intended to represent a broad category of these elements found in most compilers. The constitutions and basic functions of these elements are well known and will not be otherwise described further here.

For further descriptions on various parsers, intermediate representation builders, semantic analyzers, and code generators, see A. V. Aho, R. Sethi, and J. D. Ullman, *Compilers Principles, Techniques and Tools*, Addison-Wesley, 1986, pp. 25-388, and 463-512.

Figure 6:
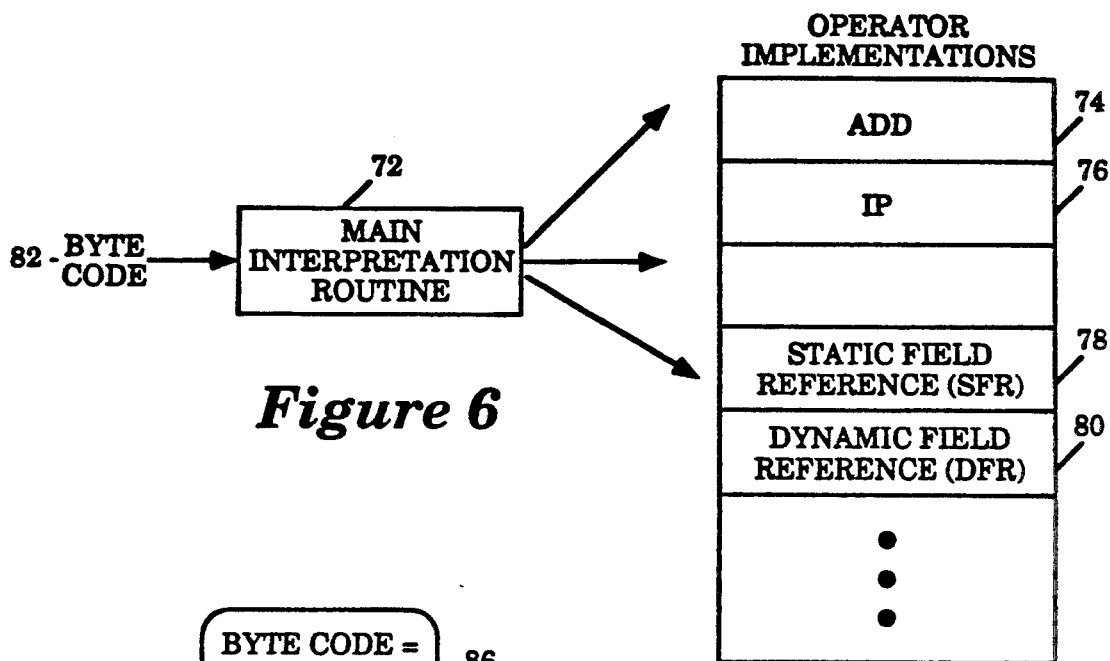
FIG. 6 illustrates one embodiment of the interpreter and operator implementations of the hybrid compiler-interpreter of the present invention.
Figure 7:
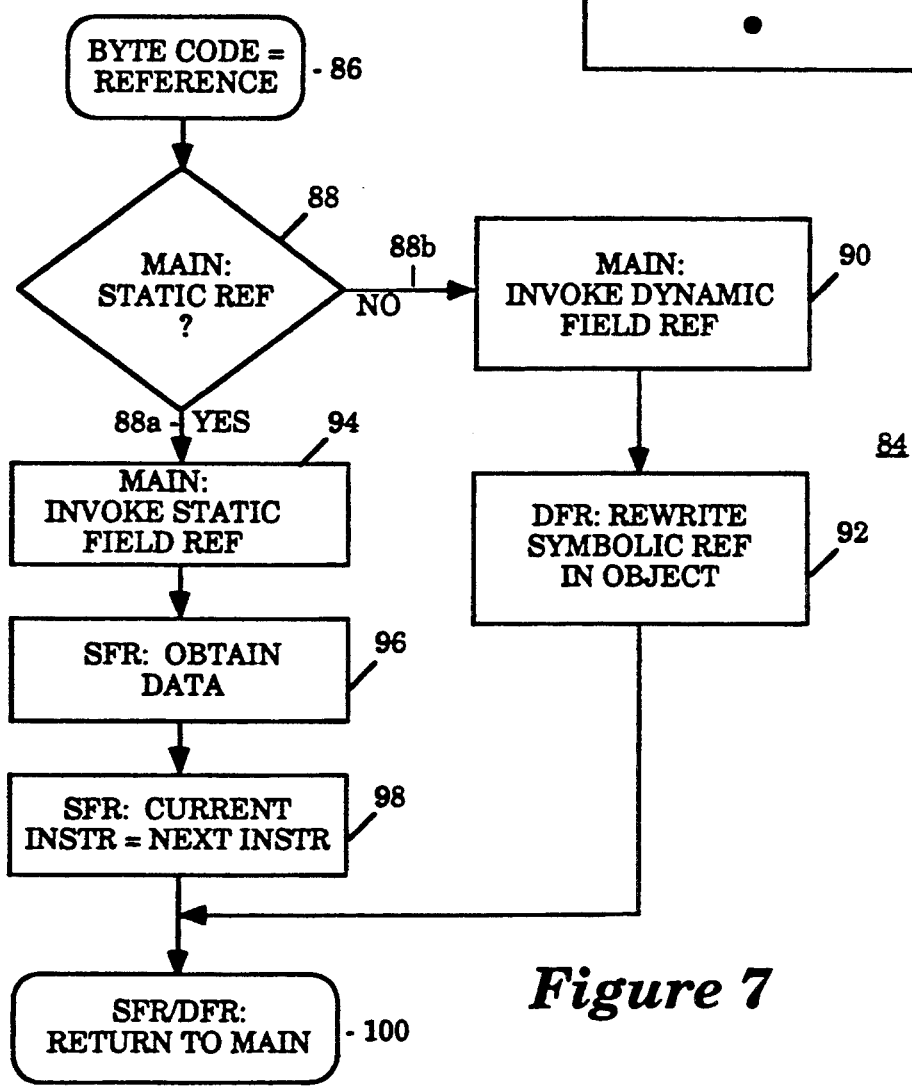
FIG. 7 illustrates the cooperative operation flows of the main interpretation routine, the static field reference routine and the dynamic field reference routine of the present invention.

Referring now to FIGS. 6 and 7, two block diagrams illustrating one embodiment of the interpreter of the hybrid compiler-interpreter of the present invention and its operation flow for handling data references is shown. As shown in FIG. 6, the interpreter 70 comprises a main interpretation routine 72, a number of complimentary operator specific interpretation routines, such as the ADD and the IF interpretation routines, 74 and 76, and two data reference interpretation routines, a static field reference routine (SFR) and a dynamic field reference routine (DFR), 78 and 80. The main interpreter routine 72 receives the byte codes 82 of the intermediate form object code as inputs, and interprets them, invoking the operator specific interpretation routines, e.g. 74 and 76, and the data reference routines, 78 and 80, as necessary. Except for the dynamic field reference routine 80, and the manner in which the main interpretation routine 72 and the state field reference routine 78 cooperates with the dynamic field reference routine 80 to handle data references, the main interpretation routine 72, the operator specific interpretation routines, e.g. 74 and 76, and the static field reference routine 78, are intended to represent a broad category of these elements found in most compilers and interpreters. The constitutions and basic functions of these elements are well known and will not be otherwise described further here.

As shown in FIG. 7, upon receiving a data reference byte code, block 86, the main interpretation routine determines if the data reference is static, i.e. numeric, or dynamic, i.e. symbolic, block 88. If the data reference is a symbolic reference, branch 88b, the main interpretation routine invokes the dynamic field reference routine, block 90. Upon invocation, the dynamic field reference routine resolves the symbolic reference, and rewrites the symbolic reference in the intermediate form object code as a numeric reference, block 92. Upon rewriting the data reference in the object code, the dynamic field reference routine returns to the main interpretation routine, block 100, without advancing the program counter. As a result, the instruction with the rewritten numeric data reference gets reexecuted again.

On the other hand, if the data reference is determined to be a numeric reference, branch 88a, the main interpretation routine invokes the static field reference routine, block 94. Upon invocation, the static field reference routine obtain the data referenced by the numeric reference, block 96. Upon obtaining the data, the static field reference routine advances the program counter, block 98, and returns to the main interpretation routine, block 100.

Figure 8:
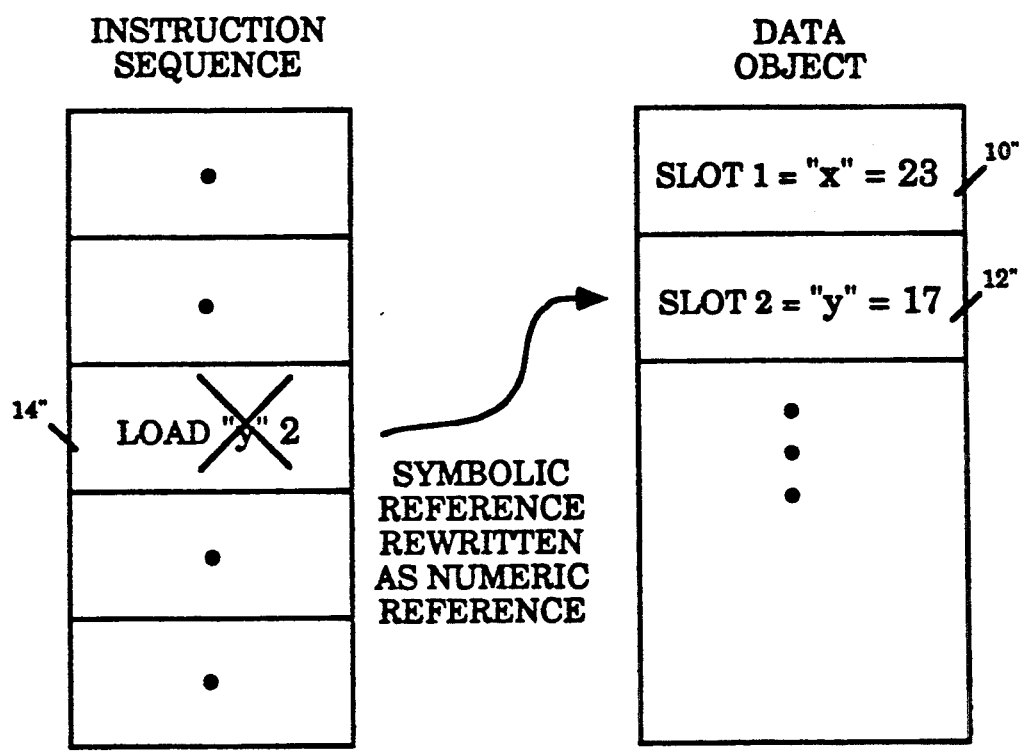
FIG. 8 illustrates an exemplary resolution and rewriting of a data reference under the present invention.

Referring now to FIG. 8, a block diagram illustrating the alteration and rewriting of data references under the present invention in further detail is shown. As illustrated, a data referencing instruction, such as the LOAD instruction 14", is initially generated with a symbolic reference, e.g. "y". Upon its first interpretation in execution, the data referencing instruction, e.g. 14, is dynamically resolved and rewritten with a numeric reference, e.g. slot 2. Thus, except for the first execution, the extra level of interpretation to resolve the symbolic reference is no longer necessary. Therefore, under the present invention, the "compiled" intermediate form object code of a program achieves execution performance substantially similar to that of the traditional compiled object code, and yet it has the flexibility of not having to be recompiled when the data objects it deals with are altered like that of the traditional translated code, since data reference resolution is performed at the first execution of a generated instruction comprising a symbolic reference.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a computer system comprising a program in source code form, a method for generating executable code for said program and resolving data references in said generated code, said method comprising the steps of:
   a) generating executable code in intermediate form for said program in source code form with data references being made in said generated code on a symbolic basis, said generated code comprising a plurality of instructions of said computer system;
   b) interpreting said instructions, one at a time, in accordance to a program execution control;
   c) resolving said symbolic references to corresponding numeric references, replacing said symbolic references with their corresponding numeric references, and continuing interpretation without advancing program execution, as said symbolic references are encountered while said instructions are being interpreted; and
   d) obtaining data in accordance to said numeric references, and continuing interpretation after advancing program execution, as said numeric references are encountered while said instruction are being interpreted;
   said steps b) through d) being performed iteratively and interleavingly.

2. The method as set forth in claim 1, wherein, said program in source code form is implemented in source code form of an object oriented programming language.

3. The method as set forth in claim 2, wherein, said programming language is C.

4. The method as set forth in claim 2, wherein, said programming language is C++.

5. The method as set forth in claim 1, wherein,
   said program execution control is a program counter;
   said continuing interpretation in step c) is achieved by performing said step b) after said step c) without incrementing said program counter; and
   said continuing interpretation in said step d) is achieved by performing said step b) after said d) after incrementing said program counter.

6. In a computer system comprising a program in source code form, an apparatus for generating executable code for said program and resolving data references in said generated code, said apparatus comprising:
   a) compilation means for receiving said program in source code form and generating executable code in intermediate form for said program in source code form with data references being made in said generated code on a symbolic basis, said generated code comprising a plurality of instructions of said computer system;
   b) interpretation means for receiving said generated code and interpreting said instructions, one at a time;
   c) dynamic reference handling means coupled to said interpretation means for resolving said symbolic references to corresponding numeric references, replacing said symbolic references with their corresponding numeric references, and continuing interpretation by said interpretation means without advancing program execution, as said symbolic references are encountered while said instructions are being interpreted by said interpretation means; and d) static reference handling means coupled to said interpretation means for obtaining data in accordance to said numeric references, and continuing interpretation by said interpretation means after advancing program execution, as said numeric references are encountered while said instruction are being interpreted by said interpretation means;

said interpretation means, said dynamic reference handling means, and said static reference handling means performing their corresponding functions iteratively and interleavingly.

7. The apparatus as set forth in claim 6, wherein, said program in source code form is implemented in source code form of an object oriented programming language.

8. The apparatus as set forth in claim 7, wherein, said programming language is C.

9. The apparatus as set forth in claim 7, wherein, said programming language is C++.

10. The apparatus as set forth in claim 6, wherein, said program execution control is a program counter.

* * * * *